United States Patent [19]

Kido et al.

[11] Patent Number: 5,229,860
[45] Date of Patent: Jul. 20, 1993

[54] AFTERIMAGE ELIMINATION CIRCUIT FOR LIQUID CRYSTAL

[75] Inventors: Koichi Kido, Yokosuka; Kaoru Kobayashi, Yokohama, both of Japan

[73] Assignee: Victor Company of Japan, Ltd., Yokohama, Japan

[21] Appl. No.: 580,918

[22] Filed: Sep. 11, 1990

[30] Foreign Application Priority Data

Sep. 11, 1989 [JP] Japan .................................. 1-235236

[51] Int. Cl.[5] ................................................ H04N 5/74
[52] U.S. Cl. ...................................... 358/236; 358/166
[58] Field of Search ................... 358/166, 167, 36, 37, 358/236, 241; 340/784, 805

[56] References Cited

U.S. PATENT DOCUMENTS

| | | | |
|---|---|---|---|
| 4,677,486 | 6/1908 | Noda et al. | 358/37 |
| 4,682,251 | 7/1987 | Hirota et al. | 358/167 |
| 4,748,498 | 5/1988 | Yamanishi et al. | 358/166 |
| 4,772,939 | 9/1988 | Fujiwara | 358/36 |
| 5,029,004 | 7/1991 | Shibayama | 358/166 |
| 5,043,815 | 8/1991 | Yoshimura et al. | 358/36 |

FOREIGN PATENT DOCUMENTS 1-195782  8/1989  Japan .
2-92174  3/1990  Japan .

*Primary Examiner*—Alvin E. Oberley
*Assistant Examiner*—Chanh Nguyen
*Attorney, Agent, or Firm*—Lowe, Price, LeBlanc & Becker

[57] ABSTRACT

An afterimage elimination circuit for a liquid crystal display apparatus provides a substantial improvement of the transient response characteristics of the liquid crystal display elements, by adding to an input video signal of the display apparatus a compensation signal, derived from that video signal, having a transient response that is determined in accordance with whether a change in the input video signal level will result in an increase or decrease of electric field strength applied to the display elements, to thereby achieve optimum compensation for both rise time and fall time response of the display elements.

18 Claims, 6 Drawing Sheets

AFTERIMAGE ELIMINATION CIRCUIT FOR LIQUID CRYSTAL

BACKGROUND OF THE INVENTION

1. Field of Application

The present invention relates to a circuit for eliminating afterimages in a picture produced by a liquid crystal display apparatus, which occur as a result of the transient response characteristics of the liquid crystal material.

2. Prior Art Technology

In recent years there has been an increasing trend towards making the display devices of various types of electronic apparatus increasingly thin and compact. For that reason, liquid crystal display devices have come into widespread application in television receivers, personal computers, etc. Such liquid crystal display devices are generally of reflected-light or backlit types, however in some cases liquid crystal display elements are used as light valves for modulation of light beams used in a projection type of display. Liquid crystal display elements are formed of a thermotropic liquid crystal material, with the operation generally being based upon changes in molecular alignment of liquid crystal which is in the nematic phase, in response to changes in an electric field that is applied to the liquid crystal. In particular, the twisted-nematic mode of operation is now widely utilized, in which liquid crystal material having a twisted-nematic molecular arrangement is enclosed as a thin layer between a pair of optical polarizer plates. With such a display device, in the absence of an applied electric field, the liquid crystal molecules are oriented such as to rotate the plane of polarization of light which passes through the liquid crystal layer. If the polarizer plates are mutually aligned such that light is enabled to pass through the combination of the polarizing plates and liquid crystal layer in that condition, then the display operates in a mode generally referred to as the normally open mode. When an electric field that is higher than a certain threshold voltage is applied to the layer, i.e. is applied to a display element, the liquid crystal molecules become aligned such that polarization by the liquid crystal layer ceases. As a result, with the normally open mode, the light is now blocked from passing through the display element, i.e. the dark, or closed state occurs. If the polarizing plates are mutually aligned such that light is blocked from passing through the combination of the polarizing plates and liquid crystal layer when no electric field is applied to the liquid crystal, then that display mode is generally referred to as the normally closed mode. In that case, application of an electric field to a display element will result in the light (i.e. open) state being produced.

A liquid crystal display device has a basic disadvantage, by comparison with other types of display device such as a CRT for example, in that the transient response of the liquid crystal to changes in an applied electric field is poor. That is to say, due to the viscosity of the liquid crystal material, there is a delay between the point in time at which the electric field is changed and the time at which a resultant change in the molecular alignment (and hence, a corresponding change towards the light or dark display condition) is completed. In the following, the time required for the liquid crystal material to complete a change in state in response to an electric field being applied (starting from an initial condition of zero applied electric field) will be designated as the rise time $t_r$ of the liquid crystal, and time required for the liquid crystal to complete a change in state in response to an electric field being removed (i.e. starting from an initial condition of that electric field being applied) will be designated as the fall time $t_d$ of the liquid crystal. When liquid crystal display elements are used to display a static image, the poor transient response characteristic does not present a problem. However when a moving image is to be displayed, the relatively high values of rise time and fall time result in afterimages being produced on the display. This seriously degrades the quality of the picture obtained with an liquid crystal display apparatus, and is a basic disadvantage of such a display apparatus.

This is a particular problem when liquid crystal display elements are to be used to implement a 3-dimensional television display of the sequential-screen type. Due to the poor transient response characteristic, there will be spatial deviations between the images that are to be successively presented to the left and right eyes of the viewer, i.e. images which occur successively along the time axis. Another example of the disadvantages of the poor transient response characteristic occurs in the case of television game displays, in which very rapid changes in image position can occur, so that the afterimages represent a substantial problem.

The aforementioned rise time $t_r$ and fall time $t_d$ of the liquid crystal can be formally expressed as follows:

$$t_r = \eta d^2 (\Delta\epsilon V^2 - Kii\pi^{(2)})^{-1} \quad (1)$$

$$t_d = \eta d^2 / Kii\pi^2 \quad (2)$$

In the above, V is the applied voltage (i.e. a transient changes between applied voltage values of zero and V occur). $\Delta\epsilon$ denotes the inductive anistropy of the liquid crystal, Kii is the elastic coefficient of the liquid crystal, $\eta$ is the viscosity of the liquid crystal, and d is the thickness of the liquid crystal layer.

The rise time $t_r$ of the liquid crystal determines the time taken for a change in a display element from the light state to the dark state in response to an increase in the voltage applied to the display element, in the case of a liquid crystal display apparatus which operates in the normally open mode. However in the case of a liquid crystal display apparatus which operates in the normally closed mode, the rise time $t_r$ determines the time taken for a change from the dark to the light state in response to an increase in the applied voltage level. Similarly, the fall time $t_d$ of the liquid crystal determines the time taken for a change in a display element from the dark state to the light state in response to a decrease in the applied voltage, in the case of a liquid crystal display apparatus which operates in the normally open mode. However in the case of a liquid crystal display apparatus which operates in the normally closed mode, the fall time $t_d$ determines the time required for a change in a display element from the light to the dark state in response to a decrease in the applied voltage.

The above equations approximately express the relationships between applied voltage and the rise time and fall time of a liquid crystal display element. However it is now known in the art that although the equation (2) indicates that the fall time of a liquid crystal display element is independent of the amplitude of applied voltage, the fall time actually does in fact depend upon the applied voltage. FIG. 1 illustrates the actual relationships between the rise time $t_r$ and fall time $t_d$ of a liquid crystal display element and the amplitude of voltage applied to the display element. It can be seen that a substantial decrease in the rise time $t_r$ will be achieved by increasing the applied voltage, and that a decrease in the fall time $t_d$ can also be achieved by increasing the applied voltage, although the degree of decrease of the fall time with increase of the applied voltage is smaller than for the rise time $t_r$.

Thus, the relationship between $t_r$ and the level of applied electric field, i.e. the video signal level, is different from the relationship between $t_d$ and the level of applied electric field. It is therefore not possible to achieve satisfactory elimination of afterimages unless signal are derived for use in that elimination which are respectively appropriate for the cases of afterimages resulting from the rise time and afterimages resulting from the fall time of the liquid crystal. That has not been achieved in the prior art.

SUMMARY OF THE INVENTION

It is an objective of the present invention to overcome the disadvantages of the prior art as set out above, by providing an afterimage elimination circuit for a liquid crystal display apparatus whereby the effects of the transient response characteristic of the liquid crystal are compensated such as to prevent afterimages from appearing in a moving-image picture generated by the display apparatus.

To achieve the above objective, the invention comprises means for deriving a compensation signal which is added to an input video signal to obtain a transient response-compensated video signal from which liquid crystal display element drive signals are generated, with the transient response compensation applied to the input video signal being such as to result in substantially improved transient response of the liquid crystal display elements. It is a basic feature of the present invention that this transient response compensation applied to the input video signal is determined in accordance with whether the input video signal is changing in a direction that will result in an increase or in a decrease in the electric field applied to the liquid crystal display elements, i.e. in accordance with whether compensation to obtain improved rise time or improved fall time response of the liquid crystal display elements is to be executed.

More specifically, according to a first aspect the present invention provides an afterimage elimination circuit for a liquid crystal display apparatus, for processing an input video signal to obtain a transient response-compensated video signal for use in generating liquid crystal display element drive signals, comprising:

low pass filter means coupled to receive the input video signal, comprising means for producing a delay equal to a plurality of field intervals of said input video signal;

subtractor means for subtracting an output signal produced from the low pass filter means from the input video signal to obtain a difference signal;

amplitude modifying means for modifying the amplitude of the difference signal in accordance with whether the input video signal changes in level in a direction which will produce an increase or a decrease in a level of electric field applied to display elements of the liquid crystal display apparatus, to thereby obtain an amplitude modified difference signal; and adder means for adding the amplitude modified difference signal to the input video signal to obtain the transient response-compensated video signal.

According to a second aspect, the invention provides an afterimage elimination circuit for a liquid crystal display apparatus, for processing an input video signal to obtain a transient response-compensated video signal for use in generating liquid crystal display element drive signals, comprising:

low pass filter means for receiving the input video signal, comprising means for producing a delay equal to an integral number of field intervals of the input video signal;

means for selectively modifying a transient response characteristic of the low pass filter means in accordance with whether the input video signal changes in level in a direction which will produce an increase or a decrease in a level of electric field applied to display elements of the liquid crystal display apparatus;

subtractor means for subtracting an output signal produced from the low pass filter means from the input video signal to obtain a difference signal;

means for selectively modifying the amplitude of the difference signal in accordance with whether the input video signal changes in level in a direction which will produce an increase or a decrease in a level of electric field applied to display elements of the liquid crystal display apparatus, to thereby obtain an amplitude modified difference signal; and adder means for adding the amplitude modified difference signal to the input video signal to obtain the transient responsive-compensated video signal.

DESCRIPTION OF PREFERRED EMBODIMENTS

Figure 2A:
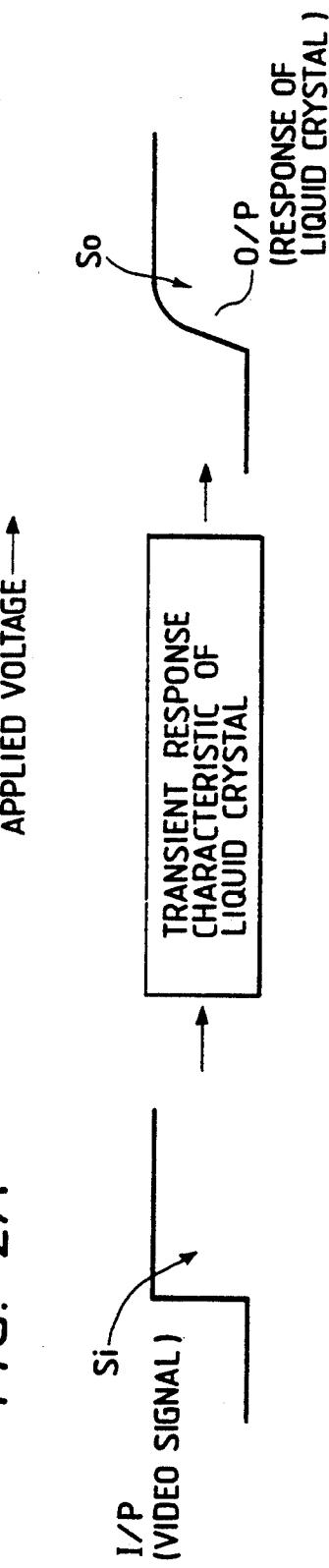
FIGS. 2A, 2B are diagrams for conceptually illustrating the principles of liquid crystal display transient response compensation by the present invention.
Figure 2B:
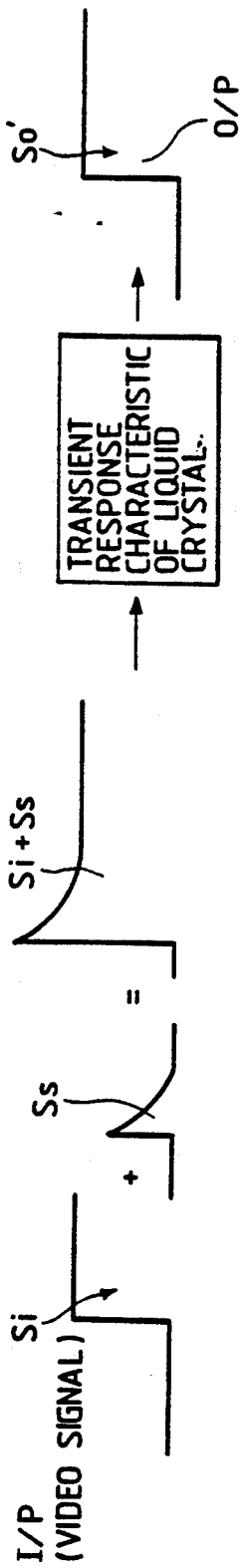

FIGS. 2A and 2B are diagrams for illustrating the basic principles of the present invention. In FIGS. 2A, 2B, $S_i$ denotes a video signal which is applied to drive a liquid crystal display apparatus. In FIG. 2A, a step change occurs in the level of the video signal, causing a step increase in the voltage applied to some display elements. However as a result of the aforementioned poor transient response characteristic of the liquid crystal, resulting from the viscosity of the liquid crystal, the corresponding change in the molecular alignment of the liquid crystal (conceptually indicated as a resultant output $S_o$ in FIG. 2A) will be delayed, in accordance with the aforementioned rise time $t_r$ of the liquid crystal display elements. With the present invention on the other hand, as illustrated in FIG. 2B, a compensation signal $S_s$ is derived in accordance with changes in amplitude of the video signal $S_i$ between successive fields or frames, and is added to the input video signal $S_i$, to obtain a transient response-compensated signal $(S_i+S_s)$, from which signals for driving the liquid crystal display elements are obtained. The compensation signal $S_s$ is determined such as to compensate for the rise time $t_r$ of the liquid crystal, so that the response of the liquid crystal display elements is as indicated by $S_o'$ in FIG. 2B.

It will be apparent that for accurate compensation, the value of the compensation signal $S_s$ must be equal to the difference between the input video signal $S_i$ and the resultant equivalent output $S_o$. In this way, effective compensation is applied for the transient response characteristic of the liquid crystal, so that a step change in the input video signal that drives the liquid crystal display elements results in a corresponding step change in the condition (i.e. molecular alignment condition, and hence degree of light transmission) of the liquid crystal display elements. Thus, delays in the response of the liquid crystal display elements to changes in the input video signal along the time axis are effectively eliminated, so that afterimages can be prevented from appearing on the display that is produced by these liquid crystal display elements.

In practice of course, perfect compensation cannot be achieved. However the present invention can provide a substantial improvement of the transient response characteristics of a liquid crystal display device.

The compensation illustrated in FIGS. 2A, 2B is for step increases in the video signal level, corresponding to changes in the electric field applied to the display elements from the zero state to a certain level of field strength, i.e. compensation for the liquid crystal rise time $t_r$. However the invention also applies compensation for changes in level of the video signal in the opposite direction, i.e. to compensate for the liquid crystal fall time $t_d$.

With the present invention, the compensation signal $S_s$ is basically derived by passing the input video signal through a low pass filter, subtracting the filter output from that video signal, and modifying the resultant signal in accordance with whether the video signal has changed in a direction that will increase or decrease the electric field applied to liquid crystal display elements.

Figure 3:
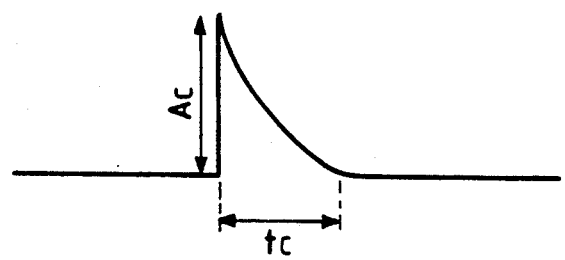
FIG. 3 is a diagram illustrating parameters of a compensation signal impulse response waveform.

As described above with reference to the equations (1) and (2), the values of the rise time $t_r$ and fall time $t_d$ vary in respectively different manners in accordance with variations in the applied voltage of the liquid crystal display elements. Thus, it is necessary to apply respectively different forms of compensation in accordance with whether an increase or a decrease of the electric field applied to a liquid crystal display element occurs. The basic principles of the present invention, operating on a video signal consisting of successive digital values which will be assumed to correspond to respective picture elements of a liquid crystal display device, are therefore as follows. For each picture element of the display, i.e. for each of these digital values, digital low-pass filtering is executed of the successive video signal values for that element, using a fixed delay which is an integral number of field intervals (for example one field, or two fields, i.e. one frame) with the values thus obtained being subtracted from the input video signal values to obtain a difference signal. The transient response waveform of that difference signal (i.e. for a step change in level of the input video signal) is illustrated in FIG. 3. It will be assumed that a "normally closed" mode liquid crystal display apparatus is used, with the display drive signals derived from an input video signal such that the minimum level of the video signal corresponds to the black level of the display, so that an increase in the video signal level results in an increased level of electric field being applied to a liquid crystal display element, i.e. a basic "normally black" mode of operation. As shown, the step response waveform of the compensation signal $S_s$ can be defined in terms of a peak amplitude $A_c$ and a duration $t_c$. In the case of a step decrease of such a video signal, a similar waveform is produced, but of opposite polarity. With a first embodiment of the present invention, described hereinafter, the amplitude $A_c$ and duration $t_c$ can be mutually independently determined in accordance with whether liquid crystal rise time or fall time compensation is to be applied, and also in accordance with the amplitude of a change in the input video signal level. With a second embodiment of the invention, the duration $t_c$ is held fixed, but the amplitude $A_c$ is determined in accordance with whether liquid crystal rise time or fall time compensation is to be applied, and also in accordance with the amplitude of a change in the input video signal level.

In that way, appropriate values for the difference signal $S_s$ are obtained, so that optimum compensation for the transient response characteristic of the liquid crystal display elements is achieved.

Figure 4:
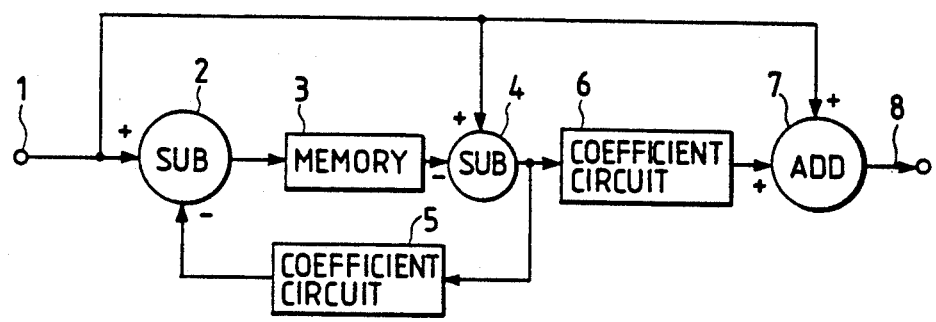
FIG. 4 is a block diagram of a first embodiment of an afterimage elimination circuit according to the present invention.

FIG. 4 is a block diagram of the first embodiment of an afterimage elimination circuit according to the present invention. Numeral 1 denotes an input terminal to which is applied an input digital video signal, and 8 is an output terminal from which a compensated video signal is supplied to a liquid crystal display apparatus (not shown in FIG. 4), for deriving display drive signals. Numerals 2 and 4 denote subtractors, and numeral 3 denotes a memory which is capable of storing one field or one frame (i.e. two fields, in the case of the usual frame interlace video signal) of the video signal. The memory 3 can be configured as a FIFO (first in first out) type of memory, or can be formed of a pair of 1-field memories with reading and writing of these memories occurring in mutually alternating field (or frame) intervals. 5 and 6 denote respective operational circuits, referred to in the following as coefficient circuits, each of which has a predetermined relationship between the input signal level applied thereto and the resultant output voltage, with that relationship varying at least in accordance with the polarity of the input signal applied thereto. In the simplest case, each of these circuits 5 and 6 could simply multiply the input signal applied thereto by a first fixed value when that input signal is positive, and by a second, different, fixed value when the input signal is negative. However in this preferred embodiment, there is a non-linear relationship between the input and output signals of each of the coefficient circuits 5 and 6 in the case of at least one polarity of the input signal. In that case, each coefficient circuit 5 and 6 can be considered as equivalent to multiplying the input signal level by a coefficient whose value varies in accordance with the level and polarity of the input signal, to obtain the output signal. In either case, it is necessary for correct operation of the feedback loop formed by the subtractor 4, coefficient circuit 5, subtractor 2 and field memory 3 that the (absolute) amplitude of the output signal produced from the coefficient circuit 5 is always less than that of the input signal to that circuit. In each field (or frame) of the input video signal, the output signal read out from the memory is subtracted from the input digital video signal in the subtractor 4, and the resultant difference signal is supplied to the coefficient circuits 5 and 6. The amplitude of that difference signal is modified by the coefficient circuit 6, and the resultant modified difference signal is added to the input digital video signal in the adder 7, to obtain a transient response-compensated video signal (i.e. corresponding to $S_i+S_s$ in FIG. 2B) which is outputted from the output terminal 8. That transient response-compensated video signal will be referred to in the following simply as a compensated video signal.

It will be assumed that the output signal from terminal 8 is supplied to a liquid crystal display which operates in the normally closed mode described above, and it will also be first assumed that a low level of the input video signal corresponds to the display black level (no electric field applied), while a high level of the video signal results in a high electric field and hence the light state of a display element being produced, i.e. that the overall operation is the "normally black" mode. However it is also possible to operate the liquid crystal display apparatus such that a low level of the input video signal results in a high value of electric field being applied to a display element, causing the light state to be produced, while a high level of the video signal results in a low value of electric field being applied, so that the dark state is produced. That operating mode will be referred to as the "normally white" mode.

The difference signal from the subtractor 4 is modified in amplitude by the coefficient circuit 5, and the resultant signal is subtracted from the input digital video signal in the subtractor 2. The resultant signal is then written into the field memory 3. Thus, the subtractor 2, field memory 3, subtractor 4 and coefficient circuit 5 constitute a closed loop, within which the difference signal can be considered to circulate, as it is successively modified in consecutive field or frame intervals. If the input signal level for a specific picture element remains constant for a long duration, the value stored in the field memory 3 corresponding to that picture element becomes identical to that signal level value. When a step change in the input signal level for that picture element occurs, a sudden increase (positive or negative-going) occurs in the output from the subtractor 4, which is modified in amplitude by the coefficient circuit 6 and then added to the input video signal as the compensation signal. Thereafter, the value held in the memory corresponding to that picture element gradually approaches the input signal level for that picture element, in successive field or frame intervals, so that the level of the compensation signal gradually falls, as illustrated in FIG. 3.

Assuming specific values of K1 and K2 for the multiplication coefficients of the coefficient circuits 5 and 6 respectively (and also assuming for simplicity that these values are fixed), designating the input signal to input terminal 1 and output signal from output terminal 8 as X(s) and Y(s) respectively, and using the delay operator $Z^{-1}$ for the 1-field or 1-frame delay introduced by the memory 3, it can be shown that the step response transfer function of the circuit of FIG. 4 is expressed by the following equation (3) as:

$$\frac{Y(s)}{X(s)} = 1 + K2 \frac{(1 - z^{-1})}{(1 - z^{-1}K1)} \quad (3)$$

It can be understood that in response to a step change in amplitude of the input video signal, the circuit of FIG. 4 produces a momentary peak output level from the subtractor 4, which thereafter falls in amplitude as illustrated in FIG. 3, with the time $t_c$ required for that signal to fall to zero being determined by the value of the coefficient K1 of the coefficient circuit 5. It can be further understood that the signal produced from the subtractor 4 is attenuated by the coefficient circuit 6, i.e. the value of the amplitude $A_c$ is determined by the value of coefficient K2 of the coefficient circuit 6.

Figure 1:
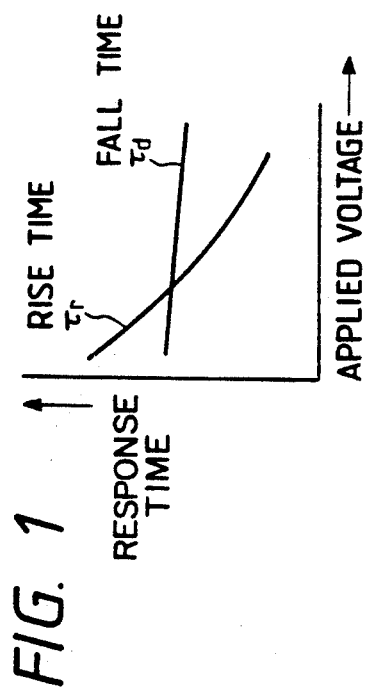
FIG. 1 is a diagram illustrating the relationships between response times of a liquid crystal display element and a drive voltage applied to the element.

It can also be understood that, since each of the coefficient circuits 5 and 6 applies respectively different values of multiplication coefficient in accordance with the polarity of the input signal applied thereto, i.e. in accordance with whether a step increase or a step decrease in the input video signal amplitude has occurred, the amplitude $A_c$ and duration $t_c$ of the compensation signal waveform that is produced as output from the coefficient circuit 6 in response to an increase in input video signal level can be predetermined to be respectively different from the values of amplitude and duration of the compensation signal waveform that is produced from the coefficient circuit 6 in response to a decrease in input video signal level. As described above referring to FIG. 1 the relationship between rise time $t_r$ of a liquid crystal display element (which in this case of the "normally black" mode determines the display response to an increase in video signal level) and the applied voltage of that display element is different from the relationship between the fall time $t_d$ of a display element (which in this case determines the response to a decrease in video signal level) and the applied voltage. Thus, the present invention enables compensation to be applied to the input video signal (by adding the compensation signal output from the coefficient circuit 6 to the input video signal in the adder 7) that is optimized in accordance with whether compensation for the rise time or for the fall time of the liquid crystal display elements is to be applied. That is to say, the circuits 5 and 6 can be configured such as to minimize the effective liquid crystal rise time and fall time. More effective elimination of afterimages is thereby achieved than has been possible in the prior art.

Figure 5A:
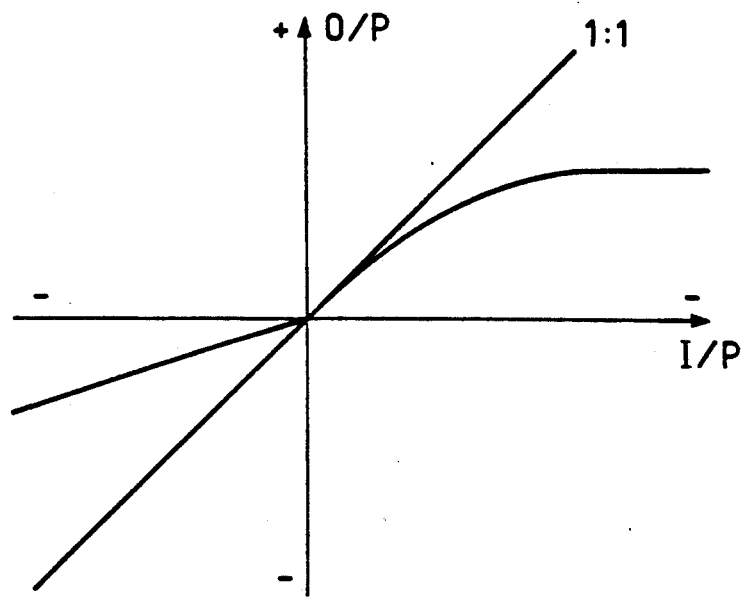
FIGS. 5A, 5B and 6A, 6B show examples of input-/output characteristics of coefficient circuits used in the embodiment of FIG. 4.
Figure 5B:
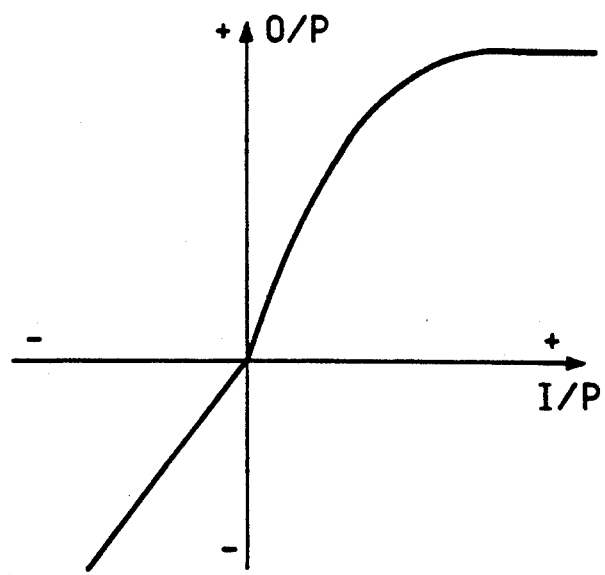

In the above description, it has been assumed that each of the coefficient circuits 5 and 6 multiplies the input signal applied thereto by a certain fixed coefficient when that input signal is positive, and by a different fixed coefficient if the input signal is negative. However from practical considerations, it has been found that it is preferable to limit the amplitude $A_c$ and duration $t_c$ of the step response of the circuit for the case in which rise time compensation is to be applied. That is to say, the absolute values of the output voltages from each of the coefficient circuits 5 and 6 are limited to values below a predetermined upper limit, and vary in a predetermined manner below that limit. FIGS. 5A and 5B show examples of input/output characteristics of the coefficient circuit 5 and the coefficient circuit 6 respectively to achieve that result, for the case of the aforementioned normally black mode, in which the minimum level of the input video signal corresponds to the black display state, with a "normally closed" liquid crystal display mode, i.e. for the case in which an increased level of video signal results in an increased level of electric field being applied to the liquid crystal display elements. As stated above, the ratio of output/input signal levels of the coefficient circuit 5 must always be less than 1, as indicated by the relationship between the input/output characteristic and the straight line representing a 1:1 input/output relationship. In FIGS. 5A, 5B and 6A, 6B input signal amplitude is plotted along the horizontal axis, and output signal amplitude along the vertical axis.

Figure 6A:
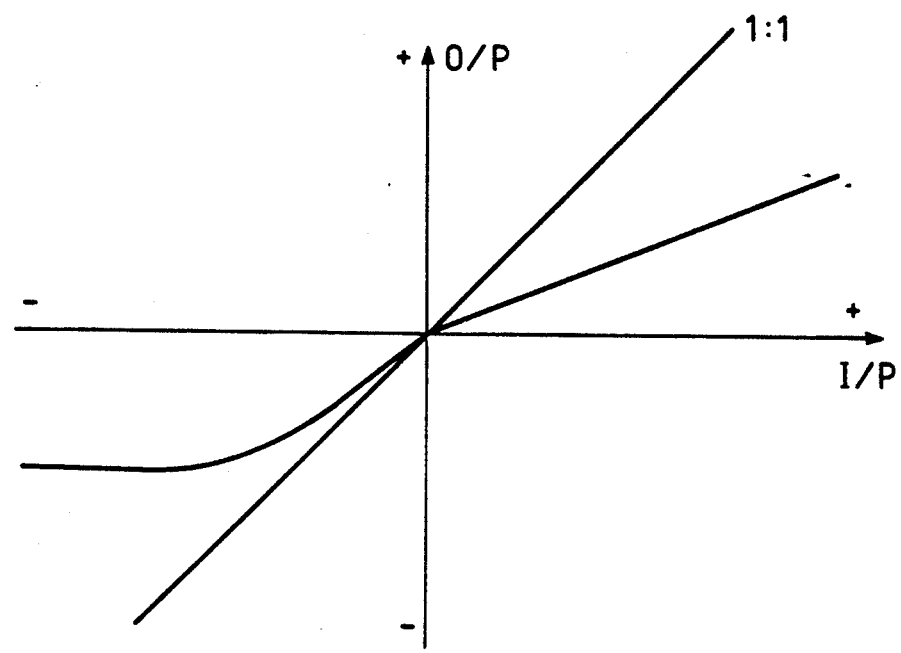
Figure 6B:
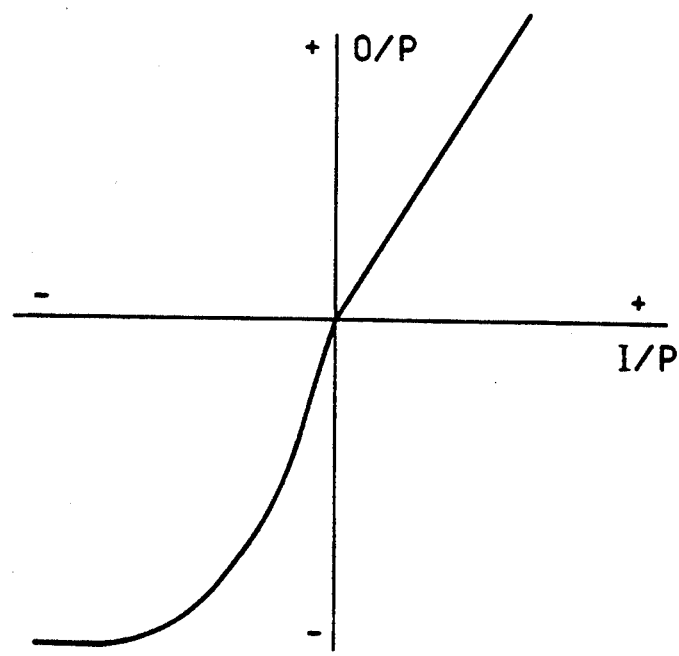

FIGS. 6A and 6B show the corresponding input/output characteristics of the coefficient circuits 5 and 6 respectively for the case of "normally white" mode operation, e.g. in which the liquid crystal display apparatus operates in the normally closed mode and in which the minimum level of the input video signal corresponds to the white display level. In that case, a decrease in the video signal level will result in an increase in the electric field applied to the liquid crystal display elements. Thus, a negative-polarity output value from the subtractor 4, i.e. a negative value of compensation signal, is produced when rise time compensation is to be applied.

Various ways of implementing the coefficient circuits 5 and 6 can be envisaged. For example, each could be implemented as a table of values held in a ROM (read-only memory), with means for determining the ROM read addresses in accordance with the amplitude and polarity of the input signal of the coefficient circuit. Alternatively, each could be implemented as a plurality of multipliers having respectively different multiplication coefficients, together with means for selecting the multipliers to act on the input signal, in accordance with the input signal amplitude and polarity. A similar effect could of course be obtained by using a single multiplier and by selecting one of a plurality of multiplication coefficients to be used by that multiplier, in accordance with the input signal amplitude and polarity.

It should be noted that the input/output characteristics for the coefficient circuits 5 and 6 shown in FIGS. 5A, 5B and 6A, 6B are given only as examples. The particular shapes of these characteristics that are actually used will depend upon the particular electrical characteristics of the of liquid crystal material in a specific display apparatus.

It can be understood from the above description that with the first embodiment of the invention, the subtractors 2 and 4, memory 3, and coefficient circuit 5 constitute in combination a digital low pass filter circuit, in which the memory 3 functions as a delay element producing a fixed delay that is equal to an integral number of field intervals of the input video signal (in general, 1 or 2), with the output from that filter circuit being produced from the memory 3. The signal obtained by subtracting that output signal of the low pass filter from the input digital signal constitutes the aforementioned difference signal, which is outputted from the subtractor 4. The amplitude of that difference signal is modified by the coefficient circuit 6, with the modification varying in accordance with whether an increase or a decrease in the input video signal level has occurred, i.e. in accordance with whether a change in input video signal level will produce an increase or a decrease in electric field applied to liquid crystal display elements that are driven based on the output signal from the afterimage elimination circuit. In addition, the transient response characteristic of the digital video signal is varied, by the coefficient circuit 5, in accordance with whether such an increase or decrease in the input video signal level has occurred, i.e. in accordance with whether a change in input video signal level will produce an increase or a decrease in that electric field.

Figure 7:
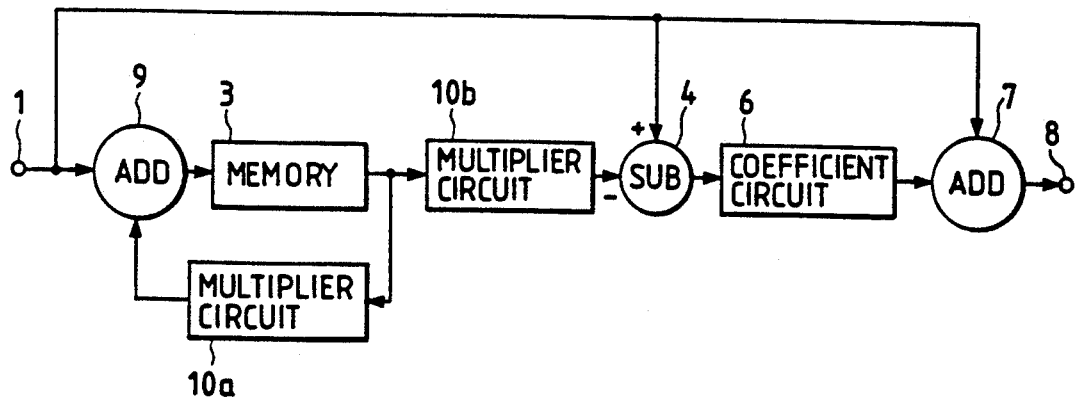
FIG. 7 is a block diagram of a second embodiment of an afterimage elimination circuit according to the present invention.

FIG. 7 shows a second embodiment of an afterimage elimination circuit according to the present invention. This includes an adder 9, in which the output signal from a coefficient circuit including a multiplier circuit 10a is added to the input digital video signal, and the result written into a memory 3. The memory 3 can be a field memory or frame memory, as described for the first embodiment. The output signal read from the field memory 3 is supplied to a pair of multiplier circuits 10a and 10b, which multiply that signal by respective fixed coefficients K and (1−K). The output signal from the coefficient circuit including multiplier circuit 10b is subtracted from the input digital video signal in a subtractor 4, to obtain a difference signal as in the first embodiment. The response of that difference signal to a step change in the input digital video signal level is identical to that of the first embodiment, and the difference signal is thereafter modified in amplitude by a coefficient circuit 6 and the result added to the input digital video signal in an adder 7 to obtain as output a compensated video signal, as in the first embodiment.

The basic operation of the circuit of FIG. 7 is similar to that of the first embodiment, and it can be shown that the step response transfer function is identical to that of the first embodiment, as expressed by equation (3) above. However, in addition to having a greater number of circuit blocks than the embodiment of FIG. 4, the circuit of FIG. 7 also has the disadvantage that it is not possible to vary the duration $t_c$ of the difference signal that is obtained from the subtractor 4, in accordance with whether compensation of liquid crystal rise time or fall time is currently being executed, as is made possible by the first embodiment as described above. That is to say, the combination of the adder 9 and the field memory 3 and multipliers 10a and 10b can provide only a fixedly predetermined duration $t_c$ of the difference signal (step response) waveform, irrespective of whether an increase or a decrease in level of the input digital video signal occurs, i.e. irrespective of the polarity of the difference signal produced from the subtractor 4. However the circuit of FIG. 7 does enable the amplitude $A_c$ of the difference signal to be determined in accordance with whether liquid crystal rise time or fall time compensation is being executed, due to the operation of the coefficient circuit 6 as described hereinabove for the first embodiment.

It can be understood that with the second embodiment of the invention, the adder 9, memory 3, and coefficient circuits 10a and 10b constitute in combination a digital low pass filter circuit, in which the memory 3 functions as a delay element producing a fixed delay that is equal to an integral number of field intervals of the input video signal (in general, 1 or 2), with the output from that filter circuit being produced from the coefficient circuit 10b. The signal obtained by subtracting that output signal of the low pass filter from the input digital signal constitutes the aforementioned difference signal, which is outputted from the subtractor 4. The amplitude of that difference signal is modified by the coefficient circuit 6, with the modification varying in accordance with whether an increase or a decrease in the input video signal level has occurred, i.e. in accordance with whether a change in input video signal level will produce an increase or a decrease in electric field applied to liquid crystal display elements that are driven based on the output signal from the afterimage elimination circuit. The transient response characteristic of the digital low pass filter circuit is fixedly determined by the value of the factor K of the coefficient circuits 10a and 10b.

Figure 8:
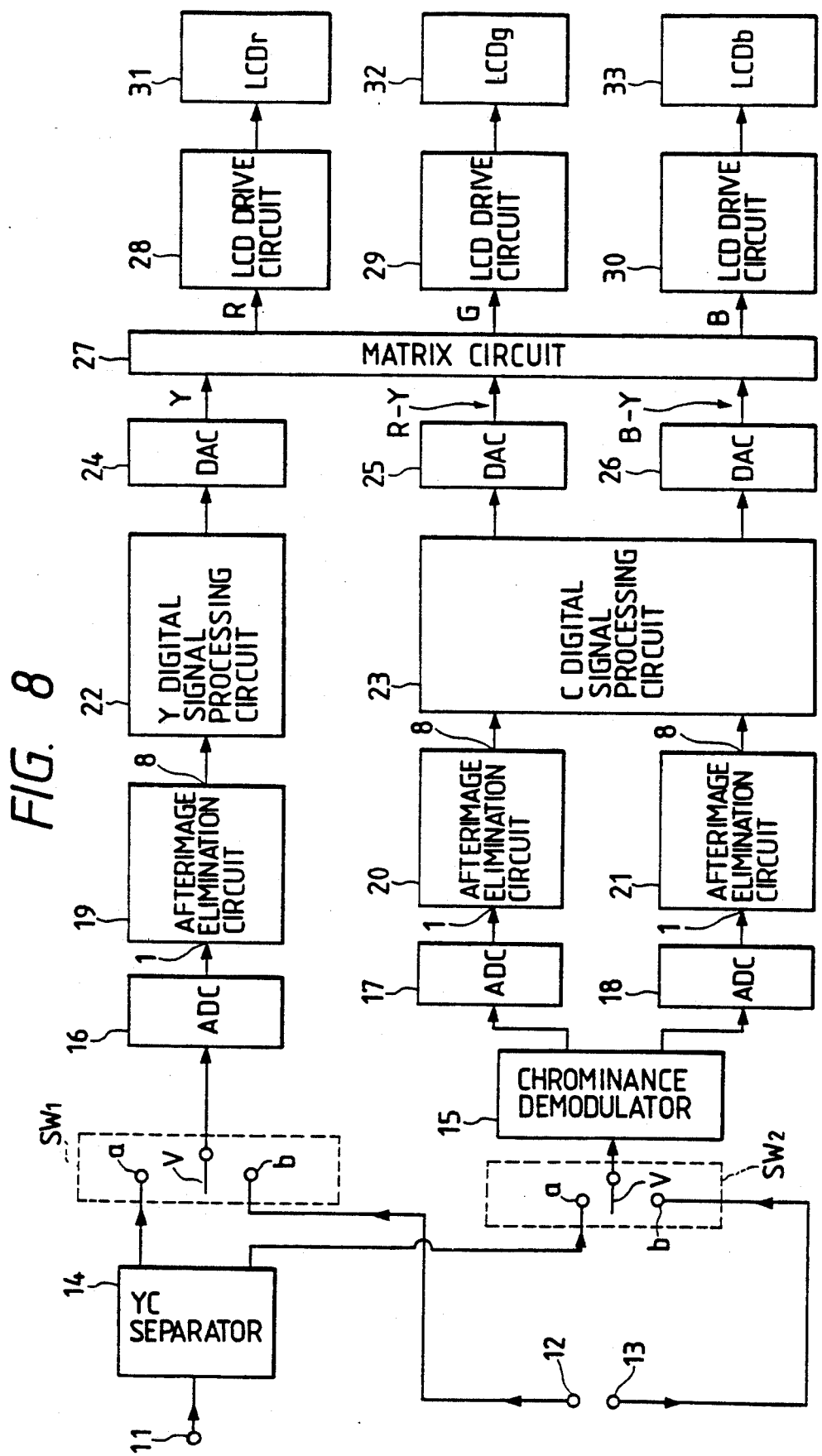
FIGS. 8 and 9 are block diagrams of examples of a liquid crystal display apparatus incorporating afterimage elimination circuits according to the present invention.

FIG. 8 shows a first example of a liquid crystal color display apparatus utilizing an afterimage elimination circuit according to the present invention, such as the first or second embodiment of the invention described hereinabove, which is capable of operation with a multiplex (composite) color video signal or separate chrominance and luminance signals as inputs. In FIG. 8, a multiplex video signal containing a chrominance signal and luminance signal (respectively designated as C and Y signals) is supplied to an input terminal 11. 12 and 13 are separate input terminals for respectively receiving luminance and chrominance signals. 14 denotes a YC separator circuit for separating the luminance and chrominance signal components of the input signal supplied to input terminal 11, with the resultant luminance Y signal being supplied to the "a" fixed terminal of a selector switch SW1 and the chrominance C signal being supplied to the "a" fixed terminal of a selector switch SW2. The luminance signal from the input terminal 12 is supplied to the "b" fixed terminal of the selector switch SW1 and the chrominance signal from the input terminal 13 is supplied to the "b" fixed terminal of selector switch SW2. Thus, the switch SW1 is used to select either the luminance signal from the output of the YC separator circuit 14 or from the input terminal 12, to be supplied to an ADC 16, while the switch SW2 selects either the chrominance signal from the output of the YC separator circuit 14 or from the input terminal 13, to be supplied to a chrominance demodulator circuit 15. The chrominance demodulator circuit 15 derives the R−Y and B−Y color difference component signals of the chrominance signal, which are respectively supplied to an ADC (analog/digital converter) 17 and an afterimage elimination circuit 20, and to an ADC 18 and an afterimage elimination circuit 21.

The digital luminance signal that is produced from the ADC 16 is supplied to an input terminal 1 of an afterimage elimination circuit 19 (corresponding to the input terminal 1 in FIG. 4 or FIG. 7), and the resultant transient response-compensated digital signal produced from output terminal 8 of the afterimage elimination circuit 19 is supplied to a Y difference signal processing circuit 22, which executes predetermined signal processing, and supplies the resultant signal to a DAC (digital/analog converter) 24. The resultant compensated analog luminance signal from the DAC 24 is inputted to a matrix circuit 27. The output digital signals from the ADCs 17 and 18 are respectively supplied to each input terminal 1 of afterimage elimination circuits 20 and 21, and the resultant compensated output signals from the afterimage elimination circuits 20, 21 are inputted to a C digital signal processing circuit 23. A compensated digital R−Y color signal and a compensated digital B−Y color signal produced from the C digital signal processing circuit 23 are respectively supplied to DACs 25 and 26, to obtain a compensated analog color difference R−Y signal and B−Y signal, which are supplied the matrix circuit 27. The matrix circuit 27 combines the analog luminance signal Y and the analog color difference signals R−Y and B−Y, to obtain three analog primary color signals designated as R, G and B respectively. These are supplied to respective LCD (liquid crystal display) drive circuits 28, 29 and 30. Respective output signals from the circuits 28, 29 and 30 are supplied to respective sets of LCD display elements 31, 32 and 33 for red, blue and green display respectively.

Each of the afterimage elimination circuits 19, 20 and 21 can have the configuration of FIG. 4 or FIG. 7, described hereinabove.

With such a liquid crystal color display apparatus, due to the effective decreases in both rise time and fall time of the liquid crystal display elements 31, 32, 33 that are produced by the compensation that is applied by the afterimage elimination circuits 19, 20 and 21, highly effective elimination of afterimages in a moving image color display is achieved.

Figure 9:
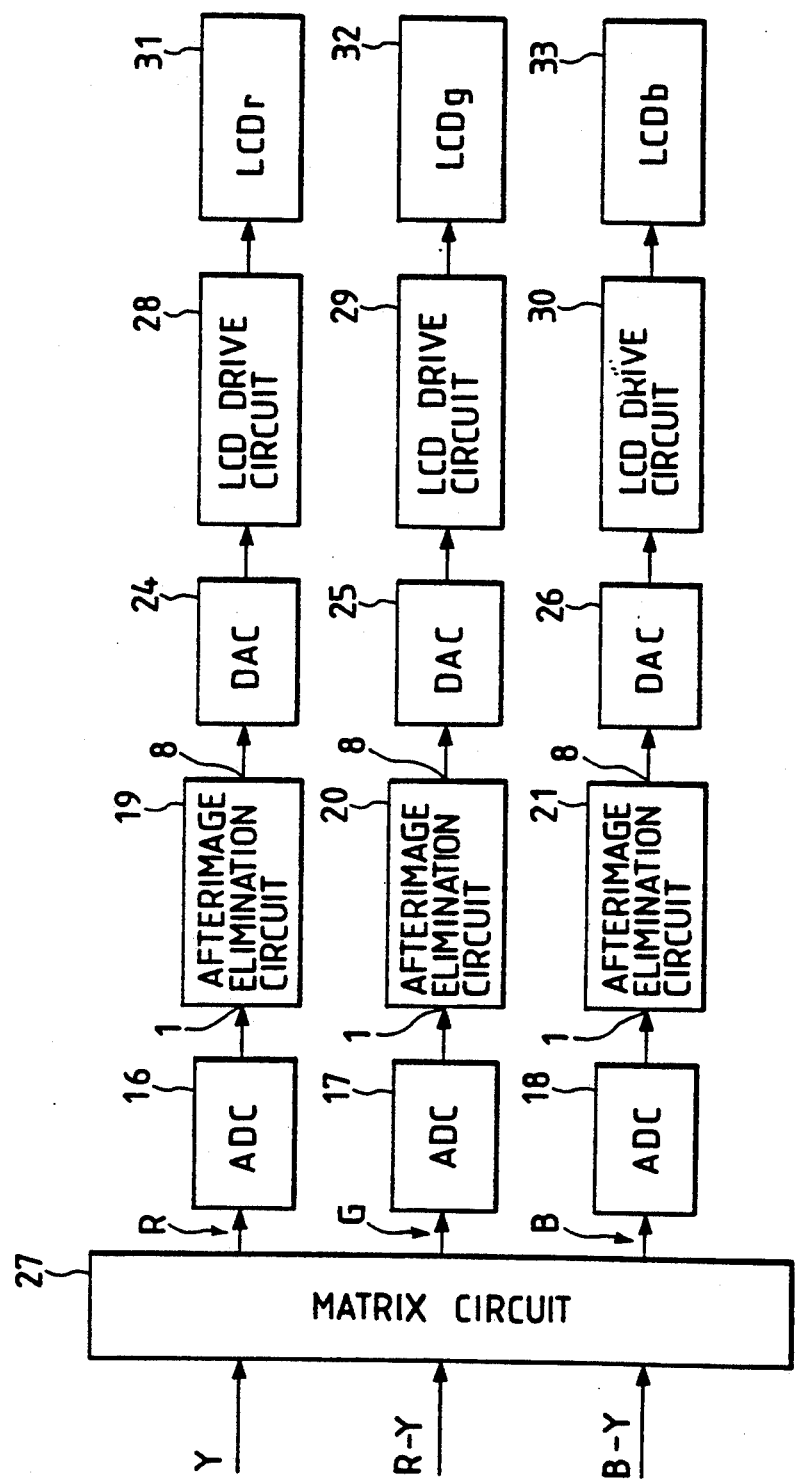

FIG. 9 illustrates a second example of a liquid crystal color display apparatus which utilizes afterimage elimination circuits according to the present invention. In FIG. 9, an analog luminance signal Y and analog color difference signals R−Y and B−Y are inputted to a matrix circuit 27. The circuits for deriving these signals can be as shown in FIG. 8, but with the afterimage elimination circuits 19, 20, 21 omitted. The matrix circuit 27 thereby produces analog primary color signals, R, G and B, which are supplied to ADCs 16, 17 and 18 to obtain respective digital primary color signals. These are respectively supplied to each input terminal 1 of three afterimage elimination circuits 19, 20 and 21, to obtain transient response-compensated digital primary color signals, which are supplied to DACs 24, 25 and 26, to obtain compensated analog R, G and B primary color signals which are respectively supplied to LCD drive circuits 28, 29 and 30 to drive sets of liquid crystal display elements 31, 32 and 33 for red, green and blue color display respectively.

Each of the afterimage elimination circuits 19, 20 and 21 can have the configuration shown in FIG. 4 or in FIG. 7, described hereinabove.

With the circuit of FIG. 9, as for the circuit of FIG. 8, highly effective elimination of afterimages in a moving image color display is achieved, due to the action of the afterimage elimination circuits according to the present invention.

What is claimed is:

1. An afterimage elimination circuit for a liquid crystal display apparatus having an array of liquid crystal display elements, for processing an input video signal to obtain a transient response-compensated video signal by modifying the input video signal to compensate for a transient response characteristics of the liquid crystal display elements for use in generating liquid crystal display element drive signals for driving said display elements, comprising:

low pass filter means for receiving said input video signal, comprising means for producing a delay equal to an integral number of field interval(s) of said input video signal;

subtractor means for subtracting an output signal produced by said low pass filter means from said input video signal to obtain a difference signal;

amplitude modifying means for modifying the amplitude of said difference signal:

by a first amount corresponding to the transient response characteristic of the liquid crystal elements to increasing electric fields when said input video signal changes in level in a direction which will produce an increase in a level of electric field applied to said liquid crystal display elements, thereby to eliminate a first type of afterimage resulting from an increase in electric field applied to the liquid crystal display elements, and by a second amount corresponding to the transient response characteristic of the liquid crystal elements to decreasing electric fields when said input video signal changes in level in a direction which will produce a decrease in said level of electric field, thereby to eliminate a second type of afterimage resulting from a decrease in electric field applied to the liquid crystal display elements, to thereby obtain an amplitude modified difference signal; and eliminating means for eliminating afterimages in said liquid crystal display elements caused by said transient response characteristics thereof, including adder means for adding said amplitude modified difference signal to said input video signal thereby to obtain said transient response-compensated video signal for use in generating said drive signals for driving said liquid crystal display elements.

2. An afterimage elimination circuit according to claim 1, wherein said first and second amounts are respective mutually different values.

3. An afterimage elimination circuit for a liquid crystal display apparatus having an array of liquid crystal display elements, for processing an input video signal to obtain a transient response-compensated video signal by modifying the input video signal to compensate for a transient response characteristics of the liquid crystal display elements for use in generating liquid crystal display element drive signals, comprising:

low pass filter means for receiving said input video signal, comprising means for producing a delay equal to an integral numbers of field interval(s) of said input video signal;

means for selectively modifying a transient response characteristic of said low pass filter means to establish a first transient response characteristic when said input video signal changes in level in a direction which will produce an increase in level of electric field applied to said display elements and to establish a second transient response characteristic when said input signal changes in level in a direction which will produce a decrease in said level of electric field, said first and second transient response characteristics being mutually different and respectively corresponding to the transient response characteristics of the liquid crystal elements to increasing and decreasing electric fields;

subtractor means for subtracting an output signal produced by said low pass filter means from said input video signal to obtain a difference signal;

means for selectively modifying the amplitude of said difference signal:

by multiplying said difference signal by a first coefficient when said input video signal changes in level in a direction which will produce an increase in a level of electric field applied to said liquid crystal display elements and by multiplying said difference signal by a second coefficient when said input video signal changes in level in a direction which will produce a decrease in said level of electric field, to thereby obtain an amplitude modified difference signal, said first and second coefficients being mutually different; and eliminating means for eliminating afterimages in said liquid crystal display elements caused by said transient response characteristics thereof, comprising adder means for adding said amplitude modified difference signal to said input video signal thereby to obtain said transient response-compensated video signal for use in generating said drive signals for driving said liquid crystal display elements.

4. An afterimage elimination circuit according to claim 3, wherein said first and second coefficients are respective mutually different fixed values.

5. An afterimage elimination circuit according to claim 3, wherein at least one of said first and second coefficients varies in accordance with the amplitude of said difference signal.

6. An afterimage elimination circuit according to claim 3 further comprising means for varying at least one of said first and second coefficients in accordance with the amplitude of said difference signal.

7. An afterimage elimination circuit for a liquid crystal display apparatus having an array of liquid crystal display elements, for processing a digital input video signal to obtain a transient response-compensated digital video signal by modifying the input video signal to compensate for a transient response characteristics of the liquid crystal display elements for use in generating liquid crystal display element drive signals, comprising:

first subtractor means, for receiving said digital input video signal as an input signal;

delay means for delaying an output signal produced by said first subtractor means by an integral number of field interval (s);

second subtractor means for subtracting from said digital input video signal a delayed output signal produced by said delay means, to produce a difference signal;

first coefficient circuit means for selectively multiplying said difference signal:

by a first coefficient, corresponding to the transient response characteristic of the liquid crystal elements to increasing electric fields, when the polarity of said difference signal indicates that said digital video signal has changed in a direction which corresponds to an increase in electric field strength applied to said liquid crystal display elements, and by a second coefficient, which corresponds to the transient response characteristic of the liquid crystal elements to decreasing electric fields, when the polarity of said difference signal indicates that said digital video signal has changed in a direction which corresponds to a decrease in said electric field strength, said first subtractor means subtracting an output signal produced by said first coefficient circuit means from said digital input video signal;

second coefficient circuit means for selectively multiplying said difference signal:

by a third coefficient, corresponding to the transient response characteristic of the liquid crystal elements to increasing electric fields, when the polarity of said difference signal indicates that said digital video signal has changed in a direction which corresponds to an increase in electric field strength applied to said liquid crystal display elements, and by a fourth coefficient, which corresponds to the transient response characteristic of the liquid crystal elements to decreasing electric fields, when the polarity of said difference signal indicates that said digital video signal has changed in a direction which corresponds to a decrease in said electric field strength, to thereby produce a modified difference signal; and adder means for adding said modified difference signal to said digital input video signal, to obtain said transient response-compensated digital video signal.

8. An afterimage elimination circuit according to claim 7, wherein said first and second coefficients are respective mutually different fixed values, and said third and fourth coefficients are respective mutually different fixed values.

9. An afterimage elimination circuit according to claim 7, wherein at least one of said first and second coefficients varies in accordance with the amplitude of said difference signal.

10. An afterimage elimination circuit according to claim 7, wherein at least one of said third and fourth coefficients varies in accordance with the amplitude of said difference signal.

11. An afterimage elimination circuit according to claim 7, further comprising means for varying at least one of said first and second coefficients in accordance with the amplitude of said difference signal.

12. An afterimage elimination circuit according to claim 11, further comprising means for varying at least one of said third and fourth coefficients in accordance with the amplitude of said difference signal.

13. An afterimage elimination circuit according to claim 7, further comprising means for varying at least one of said third and fourth coefficients in accordance with the amplitude of said difference signal.

14. An afterimage elimination circuit according to claim 7, wherein said first and second coefficients are respective mutually different values.

15. An afterimage elimination circuit for a liquid crystal display apparatus, for processing a digital input video signal to obtain a transient response-compensated digital video signal by modifying the input video signal to compensate for a transient response characteristics of the liquid crystal display elements for use in generating liquid crystal display element drive signals, comprising:

first adder means, for receiving said digital input video signal as an input signal;

delay means for delaying an output signal produced by said first adder means by an integral number of field interval (s);

first coefficient circuit means for multiplying said difference signal by a first fixed coefficient (K) and second coefficient circuit means for multiplying said difference signal by a second fixed coefficient $(1-K)$, said first adder means adding an output signal produced by said first coefficient circuit means to said digital input video signal;

subtractor means for subtracting from said digital input video signal an output signal produced by said second coefficient circuit means, to produce a difference signal;

third coefficient means for selectively multiplying said difference signal by a third coefficient, corresponding to the transient response characteristic of the liquid crystal elements to increasing electric fields, when a polarity of said difference signal indicates that said digital input video signal has changed in a direction which corresponds to an increase in electric field applied to said liquid crystal display elements, and by a fourth coefficient, corresponding to the transient response characteristic of the liquid crystal elements to decreasing electric fields, when said polarity of the difference signal indicates that said digital input video signal has changed in a direction which corresponds to a decrease in said electric field, to obtain a modified difference signal; and adder means for adding said modified difference signal to said digital input video signal thereby to obtain said transient response-compensated digital video signal for use in generating said drive signals for driving said liquid crystal display elements.

16. An afterimage elimination circuit according to claim 15, in which at least one of said third and fourth coefficients varies in value in accordance with the amplitude of said difference signal.

17. An afterimage elimination circuit according to claim 15, further comprising means for varying at least one of said third and fourth coefficients in accordance with the amplitude of said difference signal.

18. An afterimage elimination circuit according to claim 15, wherein said third and fourth coefficients are respective mutually different values.

* * * * *